Dec. 13, 1932.  F. DUNHAM  1,890,724

PRACTICE KEYBOARD AND METHOD OF PRODUCING THE SAME

Filed May 2, 1931

INVENTOR
FRANKLIN DUNHAM
BY
ATTORNEY

Patented Dec. 13, 1932

1,890,724

UNITED STATES PATENT OFFICE

FRANKLIN DUNHAM, OF BROOKLYN, NEW YORK, ASSIGNOR TO RADIO CORPORATION OF AMERICA, A CORPORATION OF DELAWARE

PRACTICE KEYBOARD AND METHOD OF PRODUCING THE SAME

Application filed May 2, 1931. Serial No. 534,580.

This invention relates to a musical instrument chart or keyboard designed for music teachers and for students, and especially for use in instructing students of musical instruments the principles of playing the same, the relative position of the keys, and the mechanical movements of the arms, hands and fingers to produce the results necessary. Although designed primarily for use in piano instruction, this chart may be used for organ and Theremin instruction or for instruction or practice on any other musical instrument which uses manual keying means to produce the notes. The invention is particularly adapted for use in classroom piano instruction, home instruction or practice, and instruction by radio broadcasting. When the general method of instruction is used the additional sense of hearing will be added to the sense of touch and sight heretofore used with practice of this nature.

To properly instruct students in the principles of music it is necessary that they should have said principles demonstrated to them occularly in some tangible form separated in regular order and in connection with the keys of the instrument to be played so as to fix said principles upon the students' minds. It is an object of the present invention to provide novel means for this purpose.

The invention consists in a chart or board representing the keyboard, or a portion thereof, of a piano or any other instrument which is keyed. The practice keyboard may be composed of any material which will hold its shape, as, for instance, cardboard, or wood, or fibre, or other composition.

Practice keyboards have been known heretofore. In some instances these keyboards have been made with perfectly flat surfaces, there being no depression between the white keys and no raising of the black keys. The user of such a keyboard, by necessity, is required to look at the board while using it to be certain of hitting the proper keys and to know when passing from one key to the next.

Practice keyboards have been known heretofore with the black keys glued on or above the surface of the white keys. In these boards the rough corners of the raised black keys injure the sensitive fingers of the user and discourage the use thereof. Furthermore, the black keys glued to the board become loose and fall off to become lost. These boards, furthermore, take up a large space, can not be readily folded, and are awkward to handle. The disadvantages indicated above and various other disadvantages, are obviated in accordance with the present invention in which the practice board is made of cardboard or other light weight material, and the keys are represented in their actual size as they appear on the piano. The spaces between the keys are depressed grooves supplemented by lines which stand out so that the fingers passing over the board will indicate through sense of touch when the practicer travels from one key to the other. The lines may be produced by pressure or by embossing. The black keys are raised above the general surface of the board and white keys. Raising of the black keys above the board may be done by hydraulic pressing of proper portions of the material of the board above the plane surface thereof. Raising of the black keys may also be done by embossing or in any other known manner. The corners of the raised keys are rounded off so that they do not injure the sensitive fingers of the user.

The advantage of the raised keys is that the one using the keyboard in practicing finger exercises or any other stages of instruction will be able to tell when the black keys are being struck and when the white keys are being struck without looking at the practice board. In other words, this board makes use of the sense of touch as well as the sense of sight. By using a keyboard in accordance with the present invention the practicer need not look at the keys but may use his sense of touch, thereby freeing his sense of sight and hearing, where radio instruction is given, to read the notes or in any other manner following the instructor.

While, as indicated above, practice boards have been known heretofore, and practice boards with raised keys have been known heretofore, but practice boards in which the sharps and flats, represented by the black keys, are raised above the white keys by embossing or pressing is novel. It is also novel to form depressions between the white keys and to round off the corners to prevent injury to the fingers of the person practicing. These features are important in the art.

An added advantage of the keyboard, as outlined above, is that it may be folded into a small size by folding it at points such that the black keys at one side of the folded portion fit into the depressions caused in forming the black keys on the other side of the folded portion.

A more complete understanding of the invention may be had by referring to the drawing in which:

Figures 2 and 3 show sectional elevations of Figure 1; while,

Figure 1:
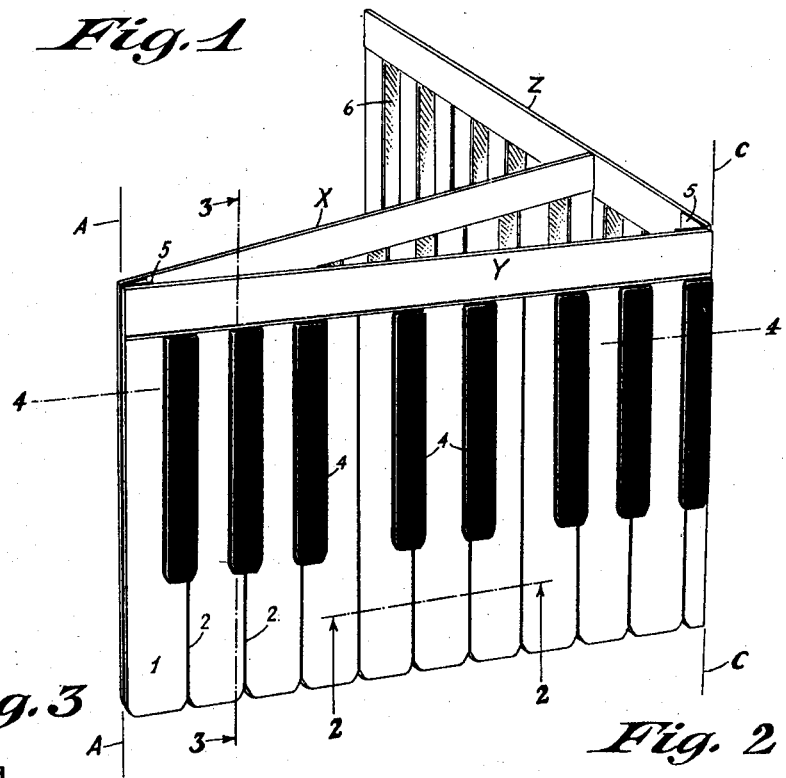
Figure 1 shows a practice board constructed in accordance with the present invention partially folded.
Figure 3:
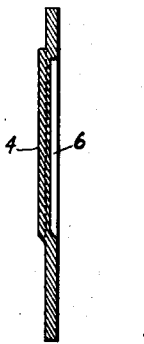
Figure 2:
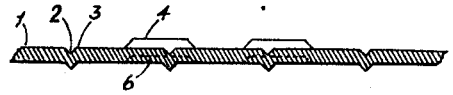

Referring to the drawing, the practice board comprises a strip of material on which the white keys 1, which are substantially similar to the keys actually used on the instrument which is to be used, are outlined by visible lines 2, which are located in depressions 3 between the keys 1 such that the fingers when passing over the keys 1 will, by the sense of touch, inform the practicer when they move from one key to another. The sharps and flats are represented by the black keys 4 raised above the surface of the board by pressure, as, for instance, by placing the blank board on which the white and black keys have been outlined in a pressing dye of the proper shape to apply pressure to the portions of the board back of the black keys. In this manner the sharp and flat keys are raised sufficiently to call the attention of the practicer when the fingers pass from the white keys to the black keys. In raising these keys depressions 6 are formed in the material as indicated in the drawing. The depressions indicated at 3 may be formed in the board by raised portions on the dyes used to form the keys 4 at the same time the keys are formed. It will be understood that the raised keys 4 and depressed lines 3 may be embossed on the board as well as pressed thereon.

Figure 4:
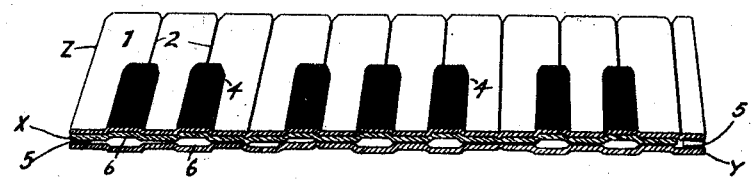
Figure 4 shows a section through the board when folded.

The board may be made in sections connected as shown by hinges 5 to fold at any convenient point, as, for instance, at the points indicated in Figure 1 by the lines AA and CC. The points at which sections of the board folds are so chosen that when the section X is folded against the section Y and the section Z is folded over the section X, as indicated in Figures 1 and 4, the depressions 6, caused on the under side of section Z in raising the keys 4, fold over the raised keys 4 on the upper surface of X so that the raised keys of X fit in the said depressions. This adds to the compactness of the keyboard and the ease with which it may be handled and carried around. The keyboard may be made of any length or any number of sections. The keyboard may be actually the exact duplicate of the keyboard of the instrument on which instructions are to be given.

Although I have disclosed the invention as being primarily adapted to piano and organ instruction, it will be used as an instruction board for any other musical instrument, as, for instance, a saxophone, etc.

Having now clearly set forth my invention and the operation thereof it will be understood that I do not wish to be limited by such disclosure except as indicated by the claims appended hereto.

Having thus described my invention and the operation thereof, what I claim is:

1. A practice keyboard comprising a strip of material, white keys outlined on said material flush with the surface thereof, depressions in said board between said white keys and black keys on said board raised above the surface thereof.

2. The method of producing a practice keyboard which includes the step of producing a strip of material, marking thereon key representations, forming depressions between certains ones of said key representations, and raising others of said key representations above the surface of the board.

3. A practice keyboard comprising two or more elongated sections of material hinged together at adjacent ends so that they may be folded one on the other, keys outlined on one side of said material, certain ones of said key surfaces being flush with the surface of the material, other of said keys having their surfaces raised above the surface of the material of said keyboard and being represented by corresponding depressions on the other side of said board, said board being hinged to fold in such a manner that the raised portions of some of said keys enter the depressions representing others of said raised keys.

4. A keyboard as recited in claim 3 in which the raised keys represent the sharps.

5. A keyboard as recited in claim 3 in which the corners of the raised keys are rounded off to prevent irritation to the fingers of the user of the board.

6. The method of producing a practice keyboard from strips of material of appreciable shape retaining strength which includes the steps of producing on said board key representations, certain of said keys being of different color than the others, raising said last named keys above the surface of the material and forming depressions on the other side of the material which coincide with said raised portions.

FRANKLIN DUNHAM.